US012759699B2

(12) United States Patent
Olson et al.

(10) Patent No.: US 12,759,699 B2

(45) Date of Patent: Oct. 13, 2026

(54) PASS-THROUGH COUPLING SHAFT

(71) Applicant: Textron Innovations Inc., Providence, RI (US)

(72) Inventors: Eric Stephen Olson, Fort Worth, TX (US); Bradford Jeffrey Ekstrom, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 447 days.

(21) Appl. No.: 18/299,609

(22) Filed: Apr. 12, 2023

(65) Prior Publication Data

US 2024/0343386 A1 Oct. 17, 2024

(51) Int. Cl.

*B64C 27/12* (2006.01)
*F16D 1/06* (2006.01)
*F16D 3/72* (2006.01)

(52) U.S. Cl.

CPC ................ *B64C 27/12* (2013.01); *F16D 1/06* (2013.01); *F16D 3/72* (2013.01)

(58) Field of Classification Search

CPC ......... B64C 27/12; B64C 27/14; B64D 35/04; B64D 35/06; F16C 2326/43; F16D 1/06; F16D 1/076; F16D 1/108; F16D 3/06; F16D 3/72; F16D 3/725; F16D 3/74; F16D 2001/103; F16D 2003/745; F16H 2057/02021; F16H 2057/02039; F16H 2057/02043–02082

See application file for complete search history.

(56) References Cited

U.S. PATENT DOCUMENTS

| | | | | | |
|---|---|---|---|---|---|
| 1,283,787 | A * | 11/1918 | Jencick | F16D 3/72 | 464/99 |
| 4,457,734 | A * | 7/1984 | Cohen | F16D 3/72 | 464/30 |
| 5,360,376 | A * | 11/1994 | Baldino | B64C 27/14 | 464/154 |
| 5,407,386 | A * | 4/1995 | Kish | F16D 3/72 | 464/99 |
| 5,529,459 | A * | 6/1996 | Pancotti | B64C 27/12 | 416/169 R |
| 5,672,112 | A * | 9/1997 | Sbabo | F16D 3/185 | 464/177 |
| 10,781,863 | B2 * | 9/2020 | Gilliland | B64D 35/04 | |
| 11,009,078 | B2 * | 5/2021 | Gilliland | F16D 3/06 | |
| 12,240,589 | B2 * | 3/2025 | Haldeman | B64D 35/04 | |

FOREIGN PATENT DOCUMENTS

| | | | | |
|---|---|---|---|---|
| DE | 1172487 B * | 6/1964 | | F16D 3/72 |
| GB | 679513 A * | 9/1952 | | F16D 3/72 |

* cited by examiner

*Primary Examiner* — Josh Skroupa

(74) *Attorney, Agent, or Firm* — Lightfoot & Alford PLLC

(57) ABSTRACT

A drive system has a gearbox, comprising a passage therethrough, a coupling shaft disposed at least partially within the passage and a first coupling carried by a first end of the coupling shaft. The first coupling is configured to accommodate misalignment. The drive system also has a second coupling carried by a second end of the coupling shaft. The second coupling is also configured to accommodate misalignment.

16 Claims, 4 Drawing Sheets

PASS-THROUGH COUPLING SHAFT

STATEMENT REGARDING FEDERALLY FUNDED RESEARCH OR DEVELOPMENT

This invention was made with Government support under Agreement No. W911W6-19-9-0002, awarded by the Army Contracting Command-Redstone Arsenal. The Government has certain rights in the invention.

BACKGROUND

Rotorcraft main rotor gearboxes carry flight loads and are often not mounted rigidly to airframe for dynamics reasons. This means they can move significantly relative to other drive system components in the aircraft. Coupling shafts are typically used to isolate these motions, however, the coupling shafts conventionally require an axial space that undesirably adds significant distance between the systems they connect so that the overall drive systems require longer than desirable longitudinal lengths. The resultant overall lengths require location of some heavy components further away from a center of gravity of the aircraft than is desired.

BRIEF DESCRIPTION OF THE DRAWINGS

Prior Art

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not limit the scope of the present disclosure. In the interest of clarity, not all features of an actual implementation can be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein can be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein can be oriented in any desired direction. In addition, as used herein, the term "coupled" can include direct or indirect coupling by any means, including moving and/or non-moving mechanical connections.

Figure 1:
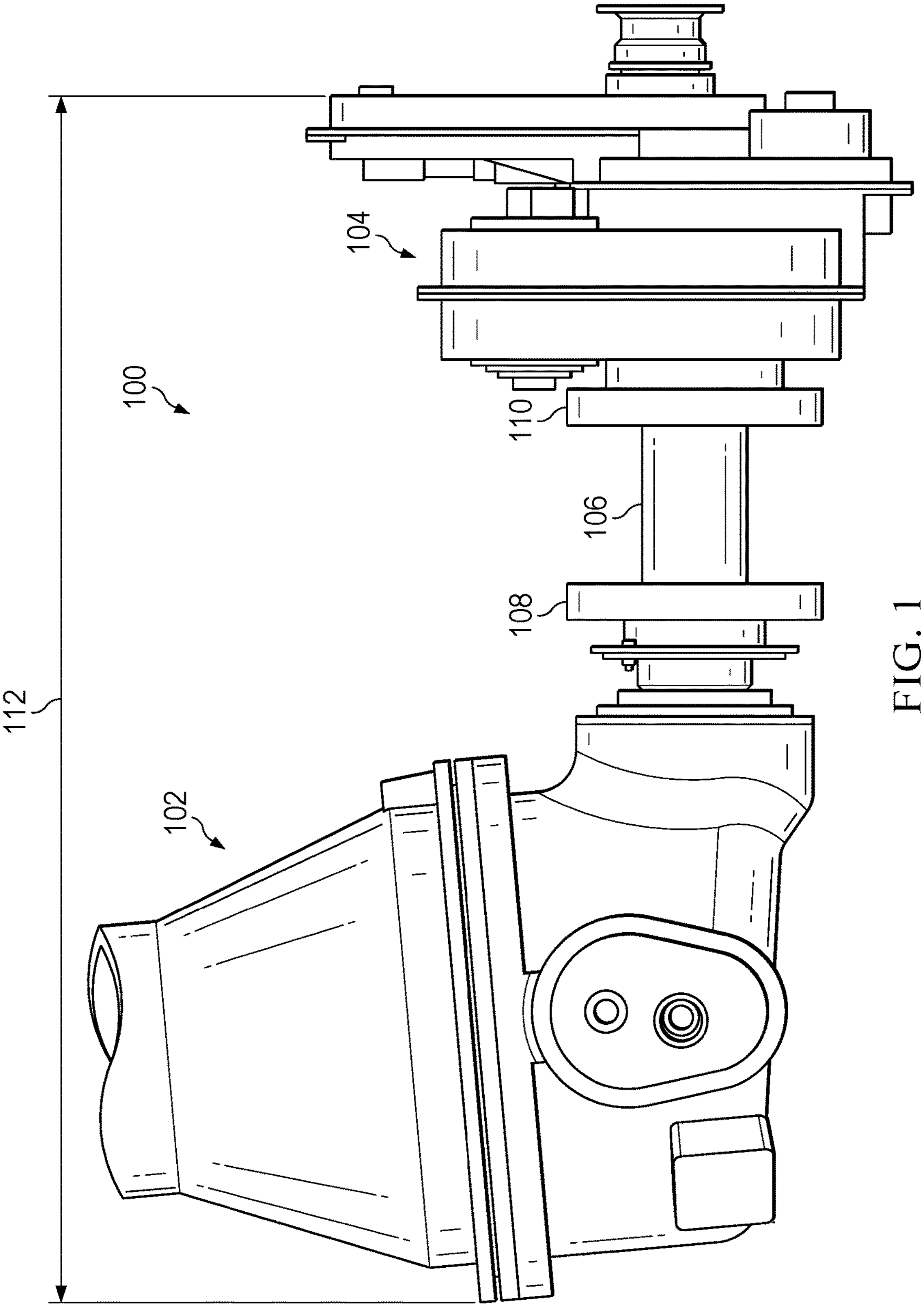
FIG. 1 (PRIOR ART)
FIG. 1 is an orthogonal side view of a portion of a conventional drive system.

Referring to Prior Art FIG. 1, a portion of a conventional drive system 100 is shown. System 100 comprises a main rotor gearbox (MRGB) 102, an intermediate gearbox 104, and a coupling shaft 106 joining that MRGB 102 and the intermediate gearbox 104. The system 100 further comprises a first coupling 108 joined between the coupling shaft 106 and the MRGB 102 and the first coupling 108 is configured to accommodate misalignment of the MRGB 102 relative to the intermediate gearbox 104. Similarly, system 100 comprises a second coupling 110 joined between the coupling shaft and the intermediate gearbox 104 and the second coupling 110 is also configured to accommodate misalignment of the MRGB 102 relative to the intermediate gearbox 104. In this embodiment, each of the first coupling 108 and the second coupling 110 are substantially similar so that substantially equal amounts of misalignment are accommodated by each. The drive system 100 can be described as comprising longitudinal packaging length 112 required to accommodate both the MRGB 102 and the intermediate gearbox 104. Notably, none of the axial length of the coupling shaft 106 longitudinally overlaps any of the intermediate gearbox 104.

Figure 2:
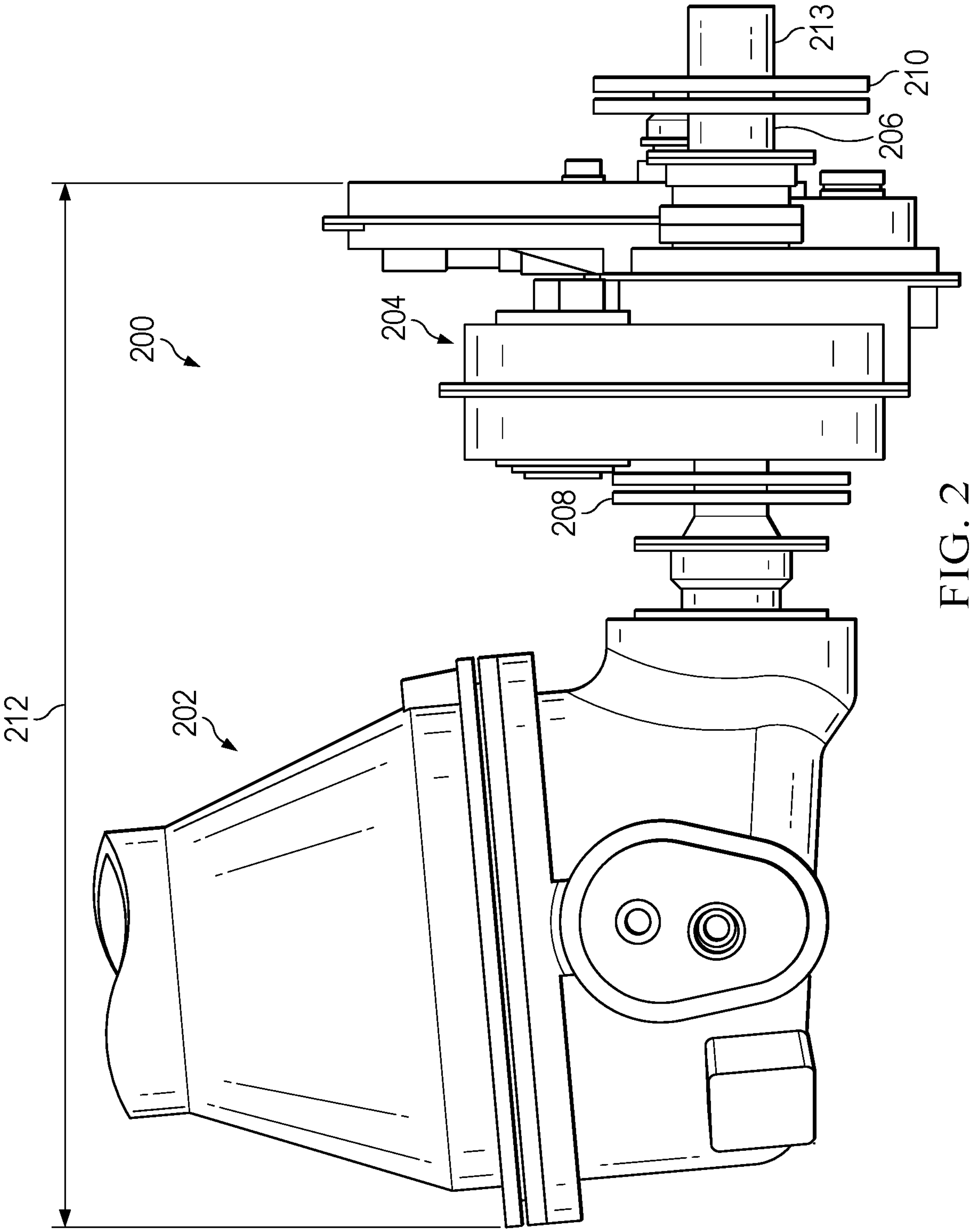
FIG. 2 is an orthogonal side view of a portion of a drive system according to an embodiment of this disclosure, the drive system having a pass-through coupling shaft according to an embodiment of this disclosure.

Referring now to FIG. 2, a drive system 200 according to an embodiment of this disclosure is shown. Drive system 200 comprises a main rotor gearbox (MRGB) 202, an intermediate gearbox 204, and a coupling shaft 206. However, unlike coupling shaft 106 of conventional drive system 100, coupling shaft 206 is received through an interior of the intermediate gearbox 204. The system 200 further comprises a first coupling 208 joined between the coupling shaft 206 and the MRGB 202 and is located longitudinally between the MRGB 202 and the intermediate gearbox 204. A second coupling 210 is carried by the coupling shaft 206. The second coupling 210 is disposed outside the intermediate gearbox 204 and is configured for connection to another drive component 212 of drive system 200. While the coupling shaft 106 and associated couplings 108, 110 are useful for accommodating misalignment between the MRGB 102 and the intermediate gearbox 104, the coupling shaft 206 and couplings 208, 210 are used to accommodate misalignment between the MRGB 202 and the drive component 212.

In this embodiment, each of the first coupling 208 and the second coupling 210 are substantially similar so that substantially equal amounts of misalignment are accommodated by each. The drive system 200 can be described as comprising longitudinal packaging length 212 required to accommodate both the MRGB 202 and the intermediate gearbox 204. It will be appreciated that when MRGB 202 is substantially the same as MRGB 102 and intermediate gearbox 104 is substantially the same as intermediate gearbox 204, packaging length 212 is substantially shorter than conventional packaging length 112. This relative shortening of the packaging length is attributable to providing longitudinal overlap between the coupling shaft 206 and the intermediate gearbox 204.

Figure 3:
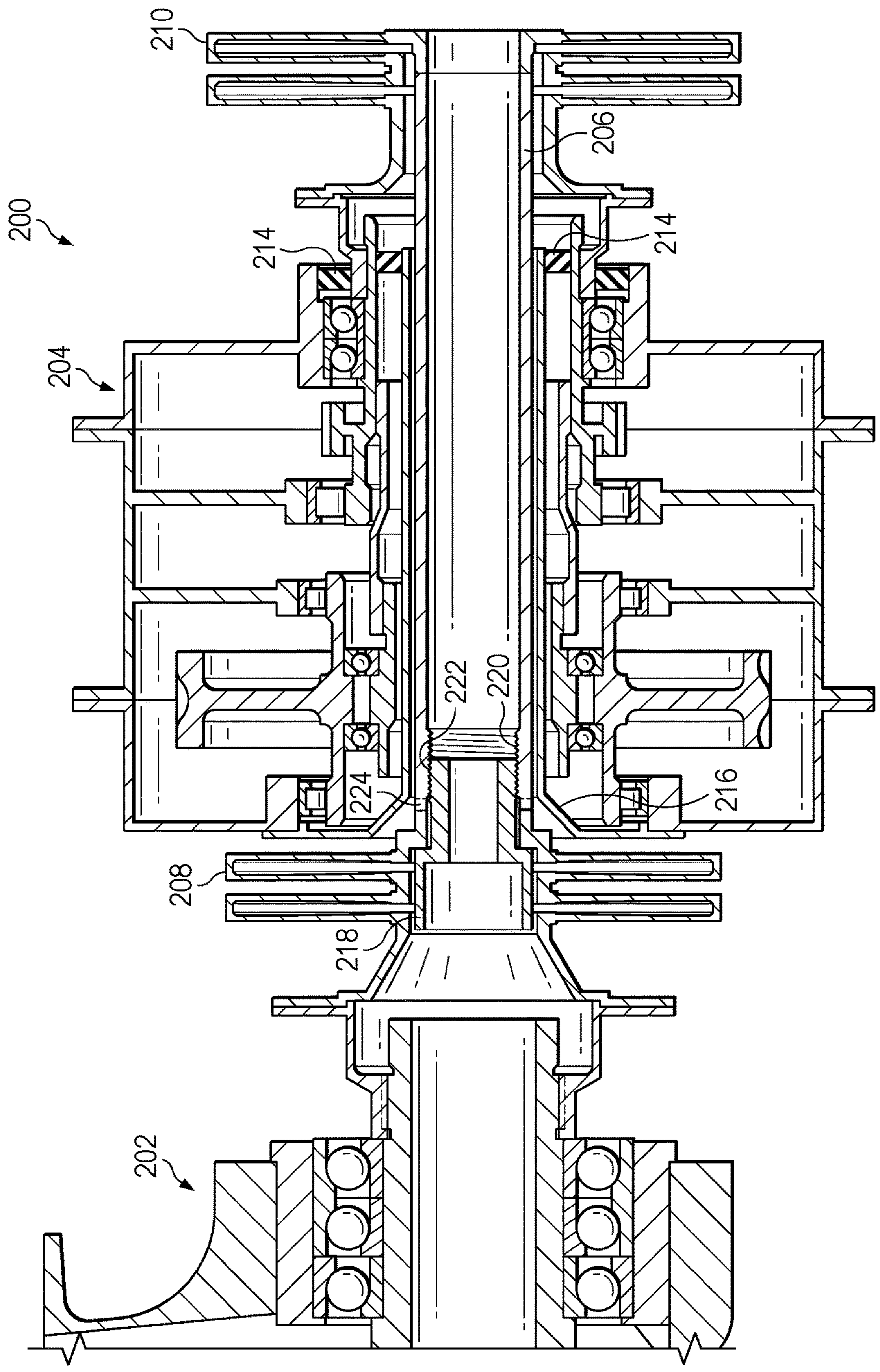
FIG. 3 is a cross-sectional orthogonal side view of a portion of the drive system of FIG. 2.

Referring now to FIG. 3, a cross-sectional view of a portion of the drive system 200 is shown. In this embodiment, coupling shaft 206 is formed with second coupling 210 being integrally formed with coupling shaft 206. Intermediate gearbox 204 comprises annular seals 214 for providing the necessary fluid sealing required for maintaining a sealed interior of the intermediate gearbox 204. The intermediate gearbox 204 is further sealed by a cap 216 that passes through the gearbox and holds a seal. The first coupling 208 is axially captured and secured to the coupling shaft 206 by use of a nut 218 that is received within the first coupling 208 and which acts against a shoulder of the first coupling when the nut 218 is tightened to coupling shaft 206 using internal threads 220 of the coupling shaft and external threads 222 of the nut 218. In this embodiment, the nut 218 further serves as an anti-flail feature. A tool can be used to grab and tighten the nut 218 by inserting the tool through an open end of the coupling shaft 206 associated with the second coupler 210. Connection between the first coupler 208 and an end of the coupling shaft 206 can be accomplished using a curvic or splined interface 224.

Figure 4:
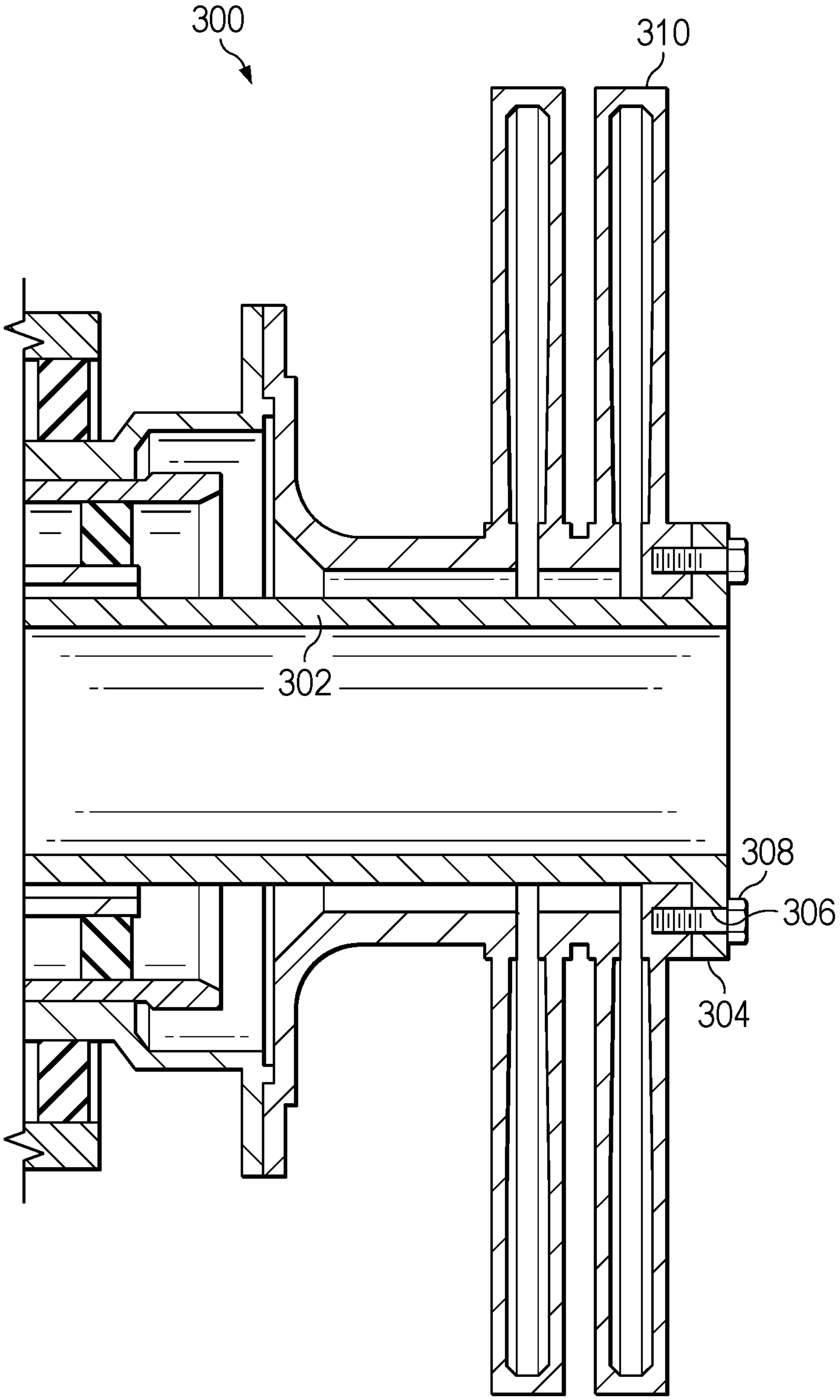
FIG. 4 is a cross-sectional orthogonal side view of a portion of another embodiment of a drive system according to this disclosure, the drive system having another embodiment of a pass-through coupling shaft according to an embodiment of this disclosure.

Referring now to FIG. 4, a cross-sectional view of an alternative embodiment of a drive system 300 is shown. In drive system 300, rather than a second coupling be integrally formed with a coupling shaft 302, coupling shaft 302 is configured with and end flange 304 comprising apertures 306 for accommodating fasteners 308, such as bolts, to connect the coupling shaft 302 to a second coupling 310.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term “optionally” with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases “at least one of A, B, and C” and “A and/or B and/or C” should each be interpreted to include only A, only B, only C, or any combination of A, B, and C.

What is claimed is:

1. A drive system, comprising:

a gearbox, comprising a passage therethrough;

a coupling shaft disposed at least partially within the passage;

a first coupling carried by a first end of the coupling shaft, the first coupling being configured to accommodate misalignment; and a second coupling carried by a second end of the coupling shaft, the second coupling being substantially similar to the first coupling and substantially similarly configured to accommodate misalignment;

wherein the first coupling is disposed external to the gearbox and axially beyond a first axial extent of the gearbox and wherein the second coupling is disposed external to the gearbox and axially beyond a second axial extent of the gearbox.

2. The drive system of claim 1, wherein the first coupling is integrally formed with the coupling shaft.

3. The drive system of claim 1, wherein the second end of the coupling shaft comprises a flange configured to receive fasteners therethrough for attaching the second coupling to the coupling shaft.

4. The drive system of claim 1, further comprising:

a tubular cap at least partially disposed within the passage and axially overlapping at least a portion of the coupling shaft.

5. The drive system of claim 4, further comprising:

an annular seal disposed on the tubular cap.

6. The drive system of claim 1, further comprising:

a nut at least partially received within each of the first coupling and the coupling shaft.

7. The drive system of claim 6, wherein the first coupling is axially captured relative to the coupling shaft by the nut.

8. The drive system of claim 6, wherein the nut comprises external threads complementary to internal threads of the coupling shaft.

9. The drive system of claim 6, wherein the nut comprises an internal profile configured to receive a tool comprising a complementary profile for rotating the nut relative to the coupling shaft.

10. The drive system of claim 6, wherein the first coupling comprises a shoulder for interfacing with the nut.

11. A drive system, comprising:

a main rotor gearbox (MRGB);

an intermediate gearbox; and a coupling shaft for connecting the MRGB to the intermediate gearbox, the coupling shaft being at least partially disposed within an interior passage of the intermediate gearbox;

wherein the intermediate gearbox is disposed axially between the MRGB and a drive system component; and wherein a first coupling configured to accommodate misalignment and a substantially similar second coupling are disposed external to the intermediate gearbox so that the intermediate gearbox is disposed axially between the first coupling and the second coupling.

12. The drive system of claim 11, wherein the second coupling is formed integrally with the coupling shaft.

13. The drive system of claim 11, wherein the second coupling is attached to a flange of the coupling shaft.

14. The drive system of claim 11, further comprising:

a nut disposed at least partially within each of the first coupling and the coupling shaft.

15. The drive system of claim 11, wherein the first coupling and the coupling shaft are connected using a curvic or splined interface.

16. The drive system of claim 11, wherein the nut comprises an internal profile configured to receive a tool having a complementary profile for rotating the nut.

* * * * *